3,378,385
HIGH ALUMINA BRICK
Donald O. McCreight, Bethel Park, Eldon D. Miller, Jr., Bridgeville, and Stanley R. Pavlica, Irwin, Pa., assignors to Harbison-Walker Refractories Company, Pittsburgh, Pa.
No Drawing. Filed June 13, 1966, Ser. No. 556,876
6 Claims. (Cl. 106—65)

ABSTRACT OF THE DISCLOSURE

A ceramically bonded, high alumina refractory made from a batch consisting essentially of fused alumina grain containing titania, finely divided chrome sesquioxide, and finely divided nonfused high alumina refractory material.

---

This invention relates to high alumina refractories and, more particularly, to improved refractory shapes of the type disclosed and claimed in U.S. Patent No. 3,192,058. Thus, broadly, the invention relates to the use of an oxide of chromium and a particular type of high alumina material in the manufacture of shaped ceramically bonded refractory articles such as brick.

As is well known in the refractories art, there are relatively few inorganic materials which are suitable by reason of high melting point, mineral stability, and various other characteristics, to serve as the base material for building refractory or ceramic articles. These materials, mostly oxides, may be generally categorized as basic or nonbasic on the basis of their mineral forming tendencies at elevated temperatures. Since the present invention is concerned with high alumina refractory materials, it is in the nonbasic group.

Density is one of the more important physical characteristics desired in refractory brick. Obtaining just a few p.c./f. increase can, in many instances, make the difference between success and failure in given process environment. Also, the refractory materials we deal with today are substantially the same refractory materials the art has been working with for hundreds of years. Indeed, improvement or advance in the art of refractories comes about by varying proportions of known ingredients, varying the physical (for example, crystalline) make-up of raw materials, variation of purity, change in sizing, etc.

Various of the foregoing have been utilized in the continuing search for increased density. For example, it is known that a fused material is probably the most dense form of a given refractory oxide. Sometimes a minor amount of additives or crystallizers assist in even greater density. Of course, for many uses, fused (i.e., fused cast) shapes are too brittle; that is to say, they lack thermal shock resistance. Thus, it has appeared that a compromise is necessary to obtain the greatest density possible without sacrificing the necessary degree of thermal shock resistance. Such a product is usually made by suitable refractory-brickmaking size-grading fusion-cast grain of a given refractory oxide material, forming into brick batches, and then firing to rebond by surface-sintering the fused grain constituents.

As mentioned above, the present case is primarily concerned with high alumina shapes. They are made by mixing together a fused high alumina grain of controlled chemistry and finely divided alumina (either the dense tabular variety or the less-dense calcined Bayer process alumina) and selected chromium sesquioxide.

The chromium oxide is very finely divided. The separate and discrete particles of the material average about one micron or less in diameter, and are remarkably uniform in this size range. It crystallizes in the hexagonal system similar to the hematite structure. Physical form is indicated by electron microscope, and crystallinity confirmed by the existence of a definite X-ray diffraction pattern. Such $Cr_2O_3$ material is water insoluble. Widely accepted specifications for such $Cr_2O_3$ are: purity minimum 97%, water soluble impurities maximum 0.5%, volatile impurities maximum 0.5%. Specific gravity is about 5.1 to 5.2.

The theoretical density of alumina is 3.97 gms. per cubic centimeter. The typical tabular alumina of commerce has a density on the order of 3.55 gms. per cubic centimeter. (There are still denser types of non-fused alumina—but they are not used widely.) Our selected fused alumina material has a specific gravity of 3.85 gms. per cubic centimeter. As can be seen, this is an extremely dense material. It includes an effective amount of titania, i.e., titanium oxide. By "effective amount" we mean sufficient to induce densification and crystal growth in the alumina during the fusion. The titanium oxide, can of course, be either the high purity pigment grade type or the less pure rutile form. The resulting fusion contains at least 95% $Al_2O_3$, from 0.5 to 5% titania, with the remainder being silica, iron oxide, alkalies, and alkaline earth oxides. Suitable aluminus raw materials for the fusion will contain at least about 90% $Al_2O_3$; for example, calcined South American bauxite is suitable. In fusing such a material as the bauxite, the otherwise undesirable silica and iron oxide constituents separate out as ferrosilicon and one obtains the total $Al_2O_3$ content above mentioned.

The chemical analysis of the preferred fused grain for the practice of our invention (by weight and on an oxide basis) is as follows:

| | Percent |
|---|---|
| Alumina ($Al_2O_3$) | 96.6 |
| Titania ($TiO_2$) | 2.8 |
| Silica ($SiO_2$) | 0.4 |
| Magnesia (MgO) | 0.22 |
| Lime (CaO) | 0.19 |
| Iron oxide ($Fe_2O_3$) | 0.14 |
| Alkalies | 0.02 |

Note that the alumina and titania amount to a little over 99% of the total composition. We prefer that these two constituents constitute at least 97% of the fused grain.

The titania can range from an effective amount, as hereinafter described, to no more than about 5%. We find about 3% to be the best figure to aim for, plus or minus a few tenths percent.

In the preferred brick of the invention, the fusion constitutes 80% of the batch. 10% of the batch is chromium sesquioxide, as above identified, and the remaining 10% is a finely divided (preferably —325 mesh) alumina of either the tabular or less-dense calcined Bayer process alumina. The preferred sizing for the preferred batch is substantially as follows: 20% passes a 4 and rests on a 10 mesh screen; 30% passes the 10 and rests on a 28 mesh screen; 10% passes a 28 and rests on a 65 mesh screen; and the remaining 40% passes a 65 mesh screen. As one can see from this analysis, the fused grain is practically all +65 mesh in the preferred practice, but up to 20% can be −65 mesh, since 20% of the total mix is the chromium sesquioxide and non-fused alumina. There, of course, can be some further variation in the −65 mesh fused grain fraction as the inherent result of raw material handling, mixing, brickmaking, etc. In actual laboratory work in which brick of the preferred type, just discussed, were manufactured as 9-inch straights (a 9-inch straight is the nominal 9 x 4½ x 2½" or 3" brick of industry), brick of a density of 210 p.c.f. were obtained. The brick were burned at 3050° F. The modulus of rupture at room temperature averaged 4020 p.s.i. The modulus of rupture at 2300° F. was 3100 p.s.i., a remarkable hot strength. In comparative work, brick made according to U.S. Patent No. 3,192,058 and of substantially identical chemical analyses were manufactured for testing on a comparative basis. The brick were according to Example II of that patent, being 90% high-purity alumina and 10% chromic oxide to thereby obtain the identical chemical analysis. The comparative brick were burned at the same temperature. They had a density of 195 p.c.f. Room temperature modulus of rupture was 4420 p.s.i., which is somewhat better than the brick of this invention. However, at 2300° F. the modulus of rupture was 2500 p.s.i., well below that of brick of the present invention.

The reasons for the high hot strength for brick of the present invention as compared to those of the patent are not completely understood. We do not believe simply the increased density of the fused grain alone could result in the increased hot strength. However, we theorize that the titania is used to dope the fusion to thereby obtain its excellen density. Later, during the burning of the brick, some titania appears to diffuse from the fused grain into the matrix constituents. Pure white particles distributed through the groundmass of the fired brick of this invention could be an indication that the titania remains in a different state of oxidation. (The grain is fairly dark gray when it is put in the original brick batch.)

Thus, the selection of the matrix-forming ingredients of the brick batch appears quite important. We did laboratory work which proved this fact. We made brick of the type disclosed in U.S. Patent No. 3,067,050, in which we substituted a large quantity of the fused grain used in this case for the tabular alumina required by certain of the species disclosed in the patent. This brick was compared with an identical brick using the therein specified tabular alumina. To our surprise, the substitution of the fused material produced an inferior brick, especially in a load test at elevated temperatures. This indicated to us that the titania diffusing from the fused grain formed reaction products with the mullite, i.e., silica containing matrix of the brick made according to the teachings of Patent No. 3,067,050, to form compounds not as refractory as the brick without the titania-containing grain.

Also, we made brick entirely of our titania-containing fused grain. Its overall size grading was substantially identical to other brick according to this invention as above discussed. These brick failed to show desired hot strength. They failed substantially at the temperature of their original firing. However, according to the present invention, brick having an alumina-chrome sesquioxide matrix are not affected by the titania at firing temperature, providing a more refractory brick which does not deform when the brick are later in service subjected to temperatures above their initial burning temperature.

As noted above, the titania content of the fused grain preferably does not exceed 5%. The lower limit is variable. There must be sufficient titania to cause appreciable, as distinguished from negligible, densification and crystal growth of the alumina during the fusion process. Less than 0.05% probably is not sufficient.

The total chrome sesquioxide is also variable. It should not be in excess of 15%. This is controlled more by size grading requirements needed to make a brick than anything else we are presently aware of. Its lower limit is flexible. However, there must be sufficient to react with the titania. In addition, if too little is present, the desirable densifying aspect discussed in U.S. Patent No. 3,192,058 will not be had. Thus, broadly, 1–15% chromic oxide, as above defined, is required for the mix.

The amount of finely divided alumina can also vary. It is dependent on the quantity of chromic oxide and fused grain present. The quantity of fused grain present is more or less controlled by refractory brickmaking size grading requirements. Conventionally, such sizing techniques require from 40 to 60% of the material to be on the order of −4+65 mesh and, thus, the remaining 40 to 60% of the material is −65 mesh. From 40 to 60% of the −65 mesh material is −325 mesh. In any event, the fused grain of the present invention usually constitutes the entire +65 mesh fractions. It can constitute up to 80% of the total brick batch. Thus, from 40–80% of the brick can be the fused grain. As this indicates, up to 20% of the batch can be −65 mesh fused grain. The chromic oxide, as above defined, constitutes 1–15% of the batch. Thus, nonfused alumina materials can constitute from 59 down to 5% of the batch. We believe there must be at least some, and preferably at least 5% of finely divided nonfused aluminous material to assure one more easily obtains the desired matrix chemistry upon firing.

In all of the foregoing discussion, we have mentioned use of very high purity tabular or Bayer process-derived alumina as the nonfused aluminous batch constituent. Other high alumina materials may be used. For example, calcined South American bauxite can be used. However, when such other materials are used, they should be substantially all −65 mesh; and the total silica content of a brick of this invention containing it should be less than about 3%, and the total iron oxide content less than about 2%. As long as these limits are maintained, other high alumina materials and blends thereof can be used. "High alumina material" has a well established meaning in the art as, for example, set forth in U.S. Patent No. 3,067,050, mentioned above. For the present invention, however, there is at least 80% $Al_2O_3$, total, in the resulting burned brick.

In the foregoing discussion, all parts and percentages are by weight, and all screen sizing is by Tyler mesh size determination, unless otherwise specified. All chemical analyses are on the basis of an oxide analysis, in conformity with the practice in the art for reporting the chemical analysis of refractory materials.

Having thus described the invention in detail and with sufficient particularity as to enable those skilled in the art to practice it, what is desired to have protected by Letters Patent is set forth in the following claims.

We claim:

1. A ceramically bonded, high alumina, refractory shape made from a batch consisting essentially of from 40 to 80% of a fused alumina grain, from 59 to 5% of a nonfused high alumina refractory material, and from 1 to 15%, by weight, of an insoluble finely divided high purity $Cr_2O_3$, substantially all the discrete particles of which are of substantially uniform size and average less than about 1 micron in diameter, said fused alumina containing from about 0.5 to 5%, by weight, of $TiO_2$, the total $Al_2O_3$ content of the brick being at least about 80%, by weight, and there being no more than about 3% $SiO_2$ and 2% $Fe_2O_3$.

2. The brick of claim 1 in which the fused grain analyzes at least 97% $Al_2O_3$ plus $TiO_2$.

3. The brick of claim 2 in which the fused grain includes about 3% $TiO_2$.

4. The brick of claim 1 characterized by: said fused grain substantially all being +65 mesh, the remainder of said batch being finely divided chrome sesquioxide and material selected from the group consisting of −65 mesh tabular alumina and calcined Bayer process alumina.

5. The brick of claim 1 in which the fused grain constitutes about 80%, by weight, of the brick, the $Cr_2O_3$ about 10% and the nonfused aluminous material the remainder.

6. The brick of claim 5 in which the overall sizing of said batch is about as follows:
   20% passes a 4 and rests on a 10 mesh screen,
   30% passes a 10 and rests on a 28 mesh screen,
   10% passes a 28 and rests on a 65 mesh screen,
   40% passes a 65 mesh screen.

References Cited

UNITED STATES PATENTS 3,067,050   12/1962   Miller _____ 106—65
3,192,058   6/1965    Davies et al. _____ 106—65

TOBIAS E. LEVOW, *Primary Examiner.*

JAMES E. POER, *Examiner.*